US012088144B2

(12) United States Patent
Christie et al.

(10) Patent No.: US 12,088,144 B2
(45) Date of Patent: *Sep. 10, 2024

(54) STATOR FOR AN ELECTRIC MOTOR

(71) Applicant: Tesla, Inc., Austin, TX (US)

(72) Inventors: Kalonica Christie, Mountain View, CA (US); James Murphy, San Jose, CA (US); Leif Olsen, San Jose, CA (US); David Nelson, Menlo Park, CA (US); Christopher Edwards, Minneapolis, MN (US)

(73) Assignee: Tesla, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/346,091

(22) Filed: Jun. 30, 2023

(65) Prior Publication Data

US 2023/0352992 A1 Nov. 2, 2023

Related U.S. Application Data

(63) Continuation of application No. 16/735,537, filed on Jan. 6, 2020, now Pat. No. 11,728,697.

(Continued)

(51) Int. Cl.
*H02K 1/14* (2006.01)

(52) U.S. Cl.
CPC ............ *H02K 1/148* (2013.01); *H02K 1/14* (2013.01); *H02K 1/141* (2013.01); *H02K 1/146* (2013.01)

(58) Field of Classification Search
CPC ........ H02K 15/022; H02K 1/14; H02K 1/146; H02K 1/148; H02K 1/141; H02K 1/16;

(Continued)

(56) References Cited

U.S. PATENT DOCUMENTS

| 7,042,130 B2* | 5/2006 | Zepp | H02K 1/148 |
| | | | 310/216.102 |
| 2004/0189136 A1* | 9/2004 | Kolomeitsev | H02K 3/345 |
| | | | 310/216.082 |

(Continued)

FOREIGN PATENT DOCUMENTS

| CN | 103280903 | 9/2013 |
| EP | 1 416 608 | 5/2004 |

(Continued)

OTHER PUBLICATIONS

Azeyanagi Toru, Stator for Rotary Electric Machine and Method of Manufacturing the same, Oct. 14, 2010—JP 2010233387 (English Machine Translation (Year: 2010).*

(Continued)

*Primary Examiner* — Alexander A Singh
(74) *Attorney, Agent, or Firm* — Knobbe, Martens, Olson & Bear, LLP (57) ABSTRACT

A stator for an electric motor is described. An example stator includes a stator core having teeth that are radially arranged about a common central axis of the stator and located in a spaced apart manner from one another. Each tooth has an inward portion and an outward portion. The example stator further includes an electrically transmissive coil of wire that is wound contiguously upon the inward portions of at least a subset of teeth from the plurality of teeth. The stator also includes wedge members that are radially arranged about the common central axis and located intermittently with the plurality of teeth such that each wedge member abuts with the outward portions of adjacently located teeth.

18 Claims, 8 Drawing Sheets

Related U.S. Application Data (60) Provisional application No. 62/789,274, filed on Jan. 7, 2019.

(58) Field of Classification Search
CPC .......... H02K 1/165; H02K 29/03; H02K 1/00; H02K 1/02; H02K 1/06; H02K 1/08; H02K 1/10; H02K 1/12; H02K 1/18; H02K 1/185; H02K 2201/15
USPC .... 310/216.001, 216.035, 216.007, 216.008, 310/216.057
See application file for complete search history.

(56) References Cited

U.S. PATENT DOCUMENTS

| | | |
|---|---|---|
| 2007/0290567 A1 | 12/2007 | Adaniya et al. |
| 2008/0185935 A1 | 8/2008 | Seiler |
| 2010/0141059 A1 | 6/2010 | Nishimura |
| 2013/0278103 A1 | 10/2013 | McPherson et al. |
| 2017/0126077 A1 | 5/2017 | Torrey et al. |
| 2019/0149022 A1 | 5/2019 | Hino et al. |
| 2020/0220395 A1 | 7/2020 | Christie et al. |

FOREIGN PATENT DOCUMENTS

| | | | |
|---|---|---|---|
| JP | 2004-023872 | 1/2004 | |
| JP | 2010-233387 | 10/2010 | |
| JP | 2010233387 A | * 10/2010 | |
| JP | 2013-546301 | 12/2013 | |
| WO | WO 19/154658 | 8/2019 | |
| WO | WO-2019154658 A2 * | 8/2019 | ............... H02K 1/02 |

OTHER PUBLICATIONS

Keller Jochen, External Stator for a Rotating Field Machine (Electric Motor), Aug. 15, 2019, WO 2019154658 (English Machine Translation) (Year: 2019).*

Cao Yuxuan, Structure of Motor Stator Core, Sep. 4, 2013, CN 103280903 (English Machine Translation) (Year: 2013).

Keller et al, External Stator for Rotating Field Machine with an Internal Rotor, Aug. 5, 2019, LSP Innovative Automotive Systems, WO 2019154658 (English Machine Translation) (Year: 2019).

International Search Report and Written Opinion dated Mar. 30, 2020 in PCT/US2020/012396.

* cited by examiner

STATOR FOR AN ELECTRIC MOTOR

INCORPORATION BY REFERENCE TO ANY PRIORITY APPLICATIONS

This application is a continuation of, and claims priority to, U.S. patent application Ser. No. 16/735,537 entitled "STATOR FOR AN ELECTRIC MOTOR" and filed on Jan. 6, 2020. U.S. patent application Ser. No. 16/735,537 claims priority to U.S. Prov. App. No. 62/789,274 entitled "STATOR FOR AN ELECTRIC MOTOR" and filed on Jan. 7, 2019, the disclosure of which is hereby incorporated herein by reference in its entirety.

Any and all applications for which a foreign or domestic priority claim is identified in the Application Data Sheet as filed with the present application are hereby incorporated by reference under 37 CFR 1.57.

BACKGROUND

Field of the Invention

The present disclosure relates to an electric motor. More particularly, the present disclosure relates to a stator for an electric motor.

Description of the Related Art

Typical electric motors have stator cores that are formed from metal laminates stacked one above another. An inner periphery of these stator cores typically define slots (or teeth) on which multiple coils of wire are wound. Each coil of wire may be wound over all or a subset of the slots. As the slots are defined only along the inner periphery of the stator core, such winding of the coil of wires over the subset of slots in the stator core may be challenging, laborious and hence, time consuming. Moreover, such winding may incur additional expense in terms of tooling requirements that are required to perform the winding of coils in the slots of the stator core.

SUMMARY

One embodiment includes a stator for an electric motor. The stator comprises a stator core having a plurality of teeth radially arranged about a common central axis of the stator core and located in a spaced apart manner from one another, each tooth having an inward portion and an outward portion; an electrically transmissive coil of wire wound contiguously upon the inward portions of at least a subset of teeth from the plurality of teeth; and a plurality of wedge members radially arranged about the common central axis and located intermittently with the plurality of teeth such that each wedge member abuts with the outward portions of adjacently located teeth.

Another embodiment includes an electric motor comprising a stator. The stator comprises a stator core having a plurality of teeth radially arranged about a common central axis of the stator core and located in a spaced apart manner from one another, each tooth having an inward portion and an outward portion; an electrically transmissive coil of wire wound contiguously upon the inward portions of at least a subset of teeth from the plurality of teeth; and a plurality of wedge members radially arranged about the common central axis and located intermittently with the plurality of teeth such that each wedge member abuts with the outward portions of adjacently located teeth.

Embodiments of the present disclosure and their corresponding advantages are best understood by referring to the detailed description that follows. It should be appreciated that like reference numerals are used to identify like elements illustrated in one or more of the figures, wherein drawings shown are for purposes of illustrating embodiments of the present disclosure and not for purposes of limiting the same.

DETAILED DESCRIPTION

Figure 1:
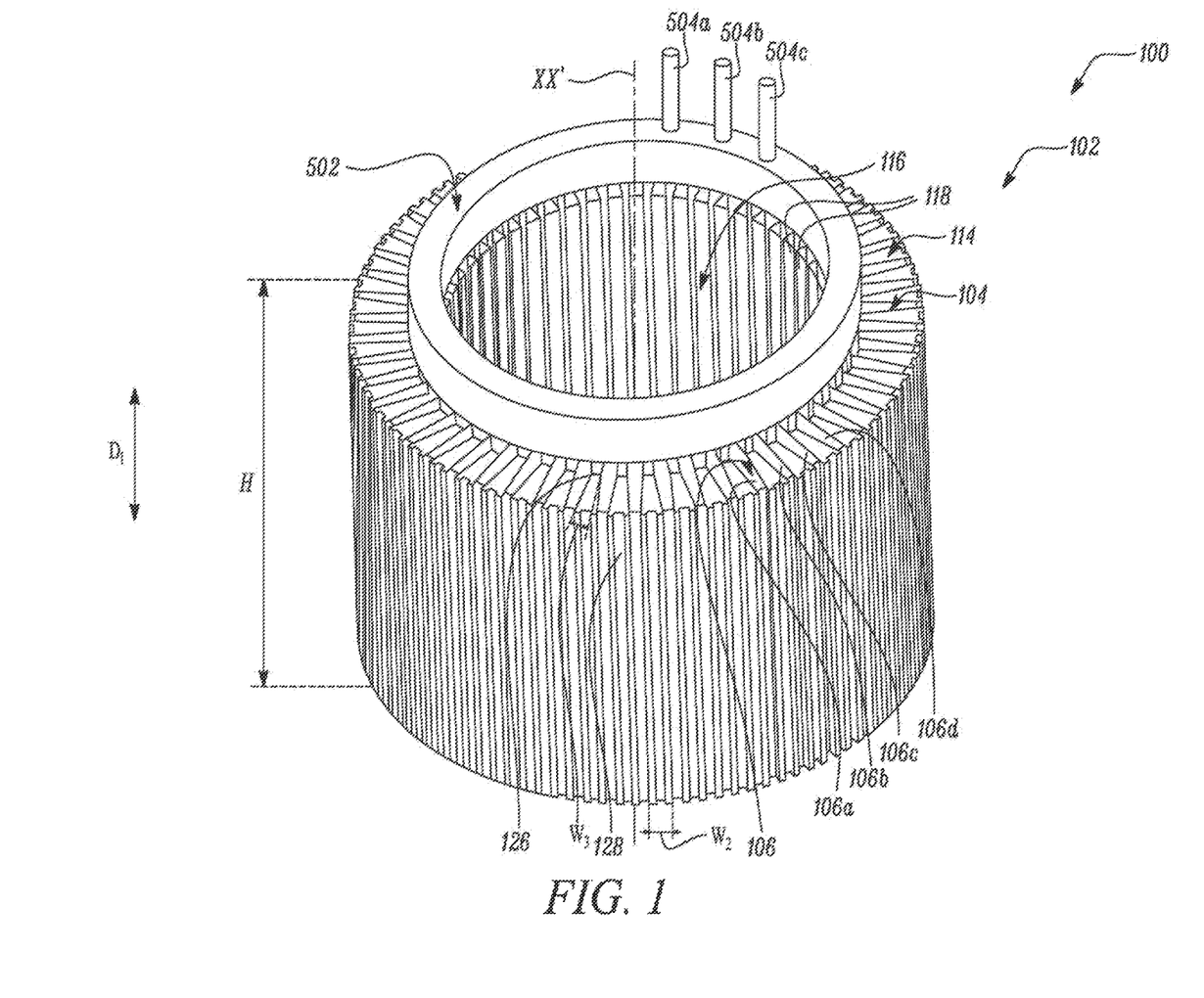
FIG. 1 illustrates a stator that is used to form an electric motor, according to certain embodiments of the present disclosure.
Figure 2:
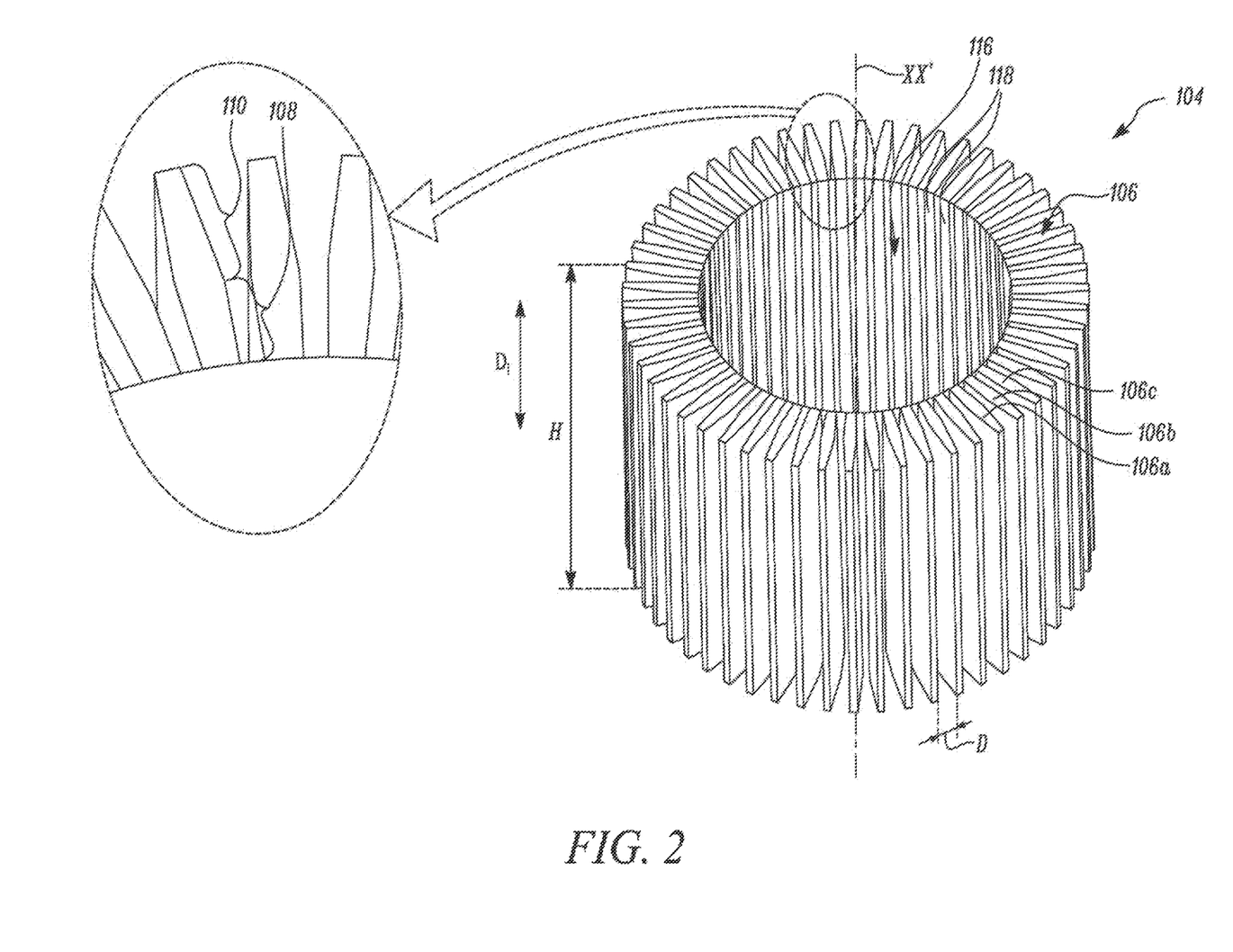
FIG. 2 illustrates a top perspective view of a stator core showing a plurality of teeth in arranged in a spaced apart manner and located radially about a common central axis of the stator core for forming the stator of FIG. 1, according to certain embodiments of the present disclosure.
Figure 3:
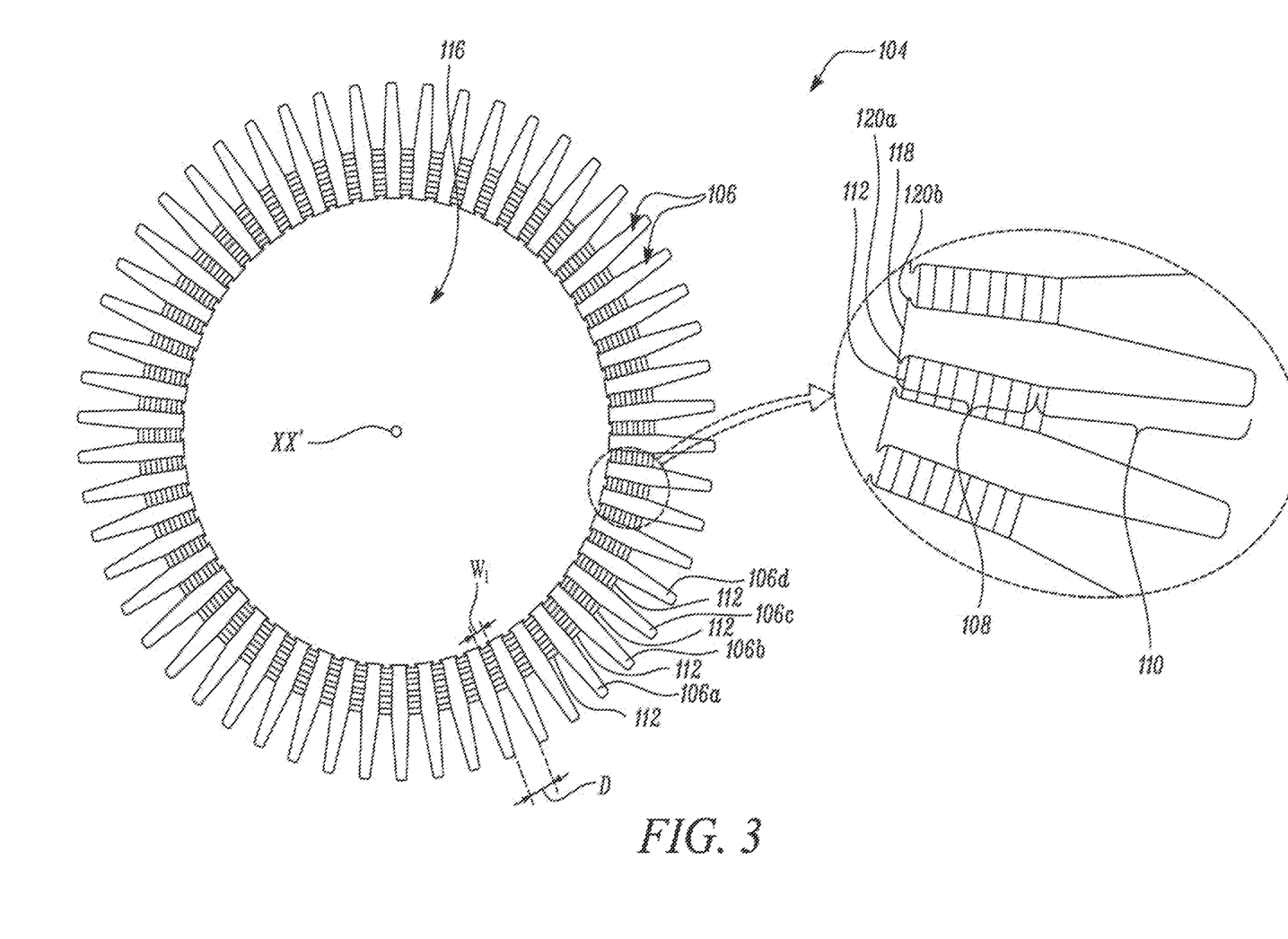
FIG. 3 illustrates a top view of the stator core in which the teeth are wound with an electrically transmissive coil of wire, according to certain embodiments of the present disclosure.
Figure 4:
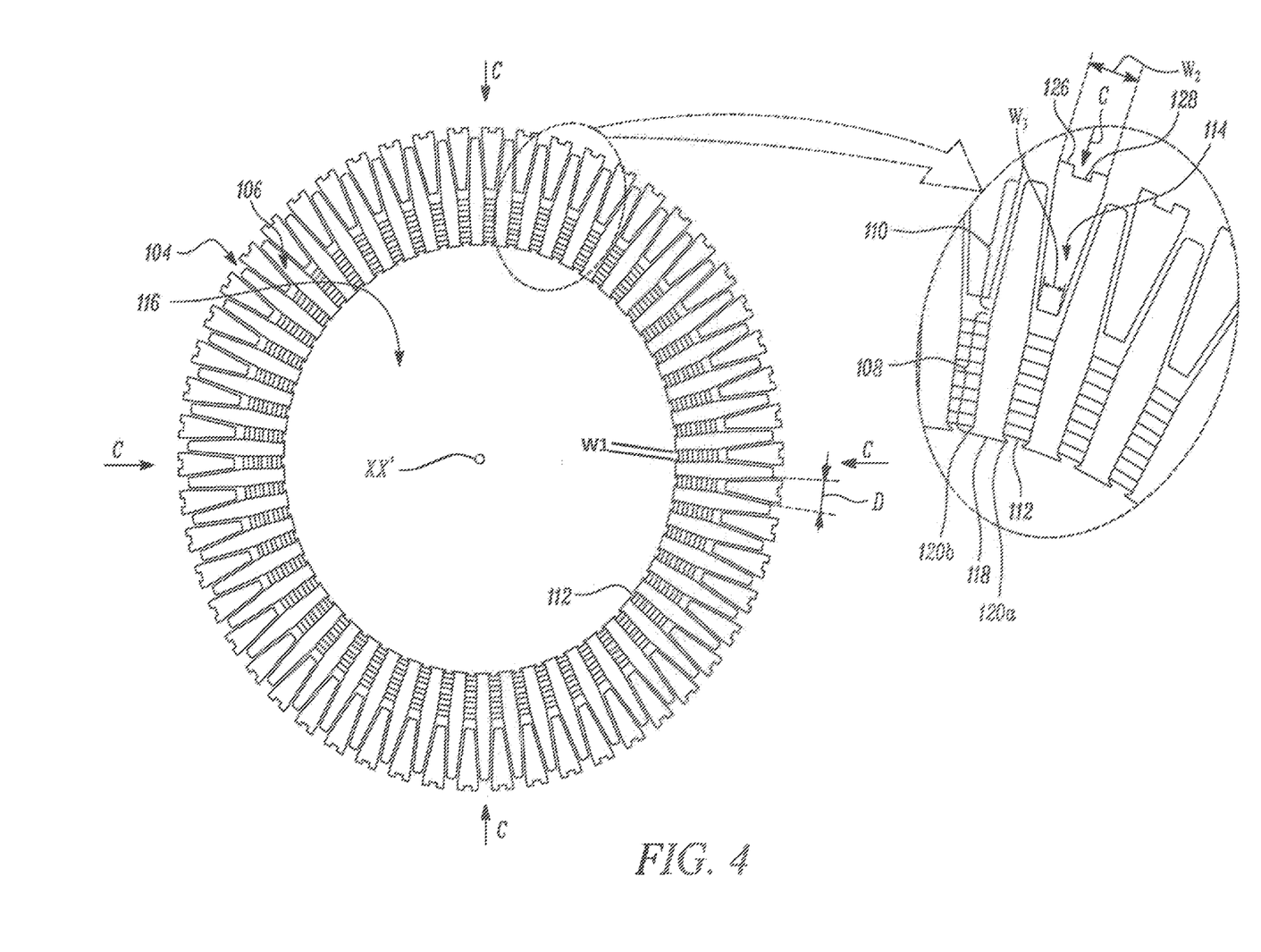
FIG. 4 illustrates a top view of the stator core shown assembled with multiple wedge members to form the stator of FIG. 1, according to certain embodiments of the present disclosure.

FIG. 1 illustrates a stator 102 that is used to form an electric motor 100 in accordance with certain embodiments of the present disclosure. The electric motor 100 formed can be a direct current motor that is powered using a direct current (DC) source (not shown) or may be powered by an alternating current (AC). In embodiments, the electric motor 100 is an alternating current inductive motor. The stator 102 may be rigidly held within a housing (not shown) of the electric motor 100. The electric motor 100 also includes a rotor (not shown) located within an annular hole 116 defined by the stator 102. In operation, the rotor is driven by the electromagnetic force generated by the stator 102.

Referring to FIGS. 1-4, the stator 102 includes a stator core 104. The stator core 104 has multiple teeth 106 that are individually denoted by reference numerals '106a', '106b', '106c', '106d' and so on (hereinafter collectively denoted by reference numeral '106'). These teeth 106 are radially arranged about a common central axis XX' of the stator core 104 and located in a spaced apart manner from one another.

Further, each tooth 106 has an inward portion 108 and an outward portion 110. Moreover, as shown, the annular hole 116 defined by the stator core 104 may be located between ends 118 of the respective inward portions 108 of the teeth 106.

The stator 102 also includes an electrically transmissive coil of wire 112 which is wound contiguously upon the inward portions 108 of at least a subset of teeth from the plurality of teeth 106. For example, a single coil of wire 112 may be wound upon the subset of teeth 106 comprising of individual tooth 106a, 106b, 106c, and 106d. Although the subset of teeth 106 disclosed herein comprises four teeth (e.g., teeth 106a, 106b, 106c, and 106d), in other embodiments, fewer or more teeth 106 may be included to form the subset of teeth 106 from amongst the teeth 106 present on the stator core 104.

The stator 102 further includes multiple wedge members 114. These wedge members 114 are radially arranged about the common central axis XX' and located intermittently with the teeth 106 of the stator core 104 such that each wedge member 114 abuts with a pair of outward portions 110 of adjacently located teeth 106.

In a certain embodiment, the end 118 of the inward portion 108 of each tooth 106 defines a pair of ledge members 120a, 120b that extend laterally from the tooth 106 and define an opening (with a width 'W1') between them. These ledge members 120a, 120b help produce the desired magnetic field to drive a rotor of the electric motor. In embodiments, the width 'W1' is less than the width of the wire such that the wire cannot be inserted from the inner portion of the stator. In embodiments, the width 'W1' between the ledge members 120a, 120b is zero. That is the teeth are connected. In embodiments, adjacently located teeth 106 are spaced apart from one another by a predetermined distance 'D'.

In embodiments, each wedge member 114 comprises a radially inward portion 122 proximal to the common central axis XX' and a radially outward portion 124 distal from the common central axis XX'. A width 'W2' of the radially outward portion 124 is greater than a width 'WJ' of the radially inward portion 122. Furthermore, an end 126 of the radially outward portion 124 of each wedge member 114 is configured to allow application of a compressive load 'C' directed radially inward towards the common central axis XX' such that the wedge members 114 frictionally engage with the teeth 106 for restricting relative movement between the teeth 106. In a certain embodiment, the end 126 of the radially outward portion 124 of each wedge member 114 defines a recessed portion 128 that extends partway along the width 'W2' of the radially outward portion 124. In this embodiment, the recessed portion 128 defined on the wedge member 114 may be used for applying the compressive load 'C' directed radially inward towards the common central axis XX' by allowing engagement with a compression tool (not shown).

In certain embodiments, the teeth 106 and the wedge members 114 may be made from a similar material. In other embodiments, the teeth 106 and the wedge members 114 may made from dissimilar materials. Materials used to form the teeth 106 and the wedge members 114 respectively may be selected based on various requirements of an application including, but not limited to, thermal requirements besides electrical conductivity, electrical transmittance, and/or resistivity desired from the teeth 106 and the wedge members 114 respectively.

Figure 5:
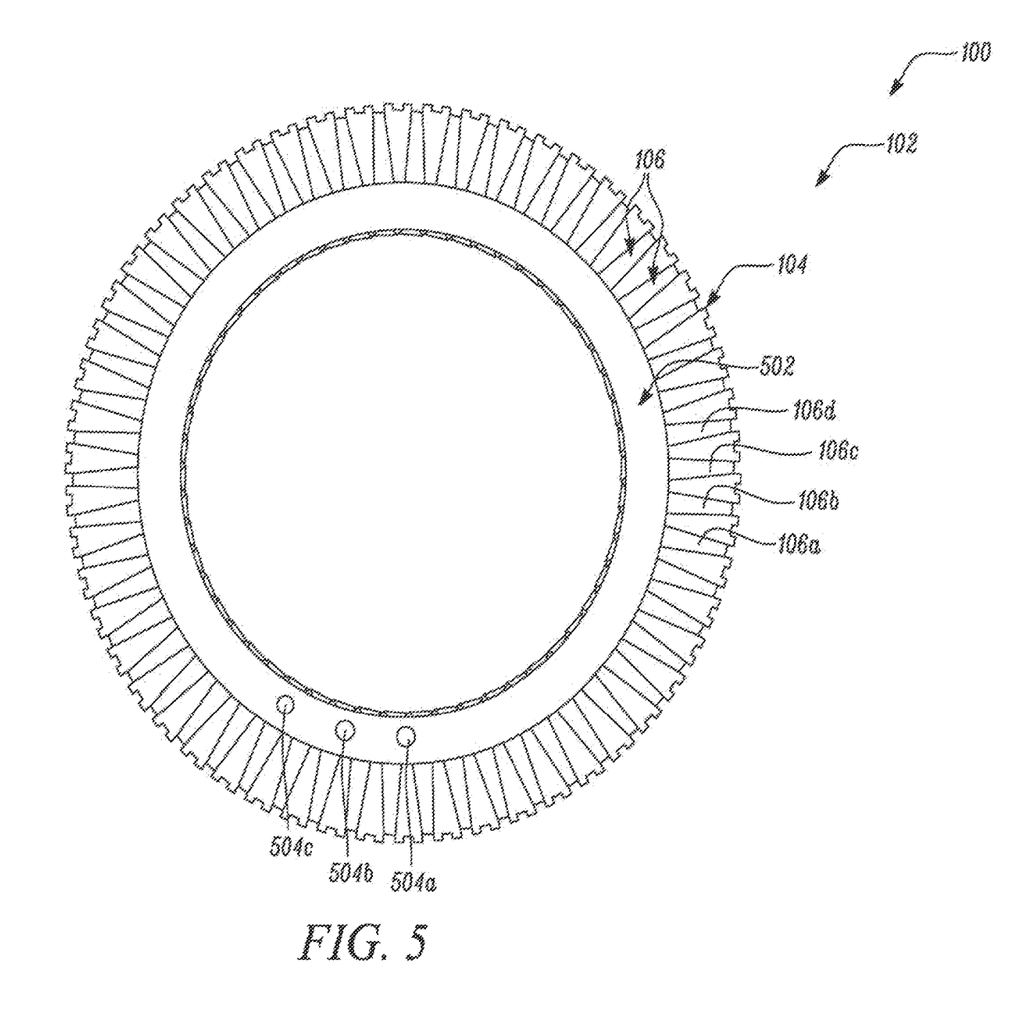
FIG. 5 illustrates a top view of the stator of FIG. 1 showing an end cap having connecting terminals that can be used to electrically connect with the electrically transmissive coil of wire, according to certain embodiments of the present disclosure.
Figure 6:
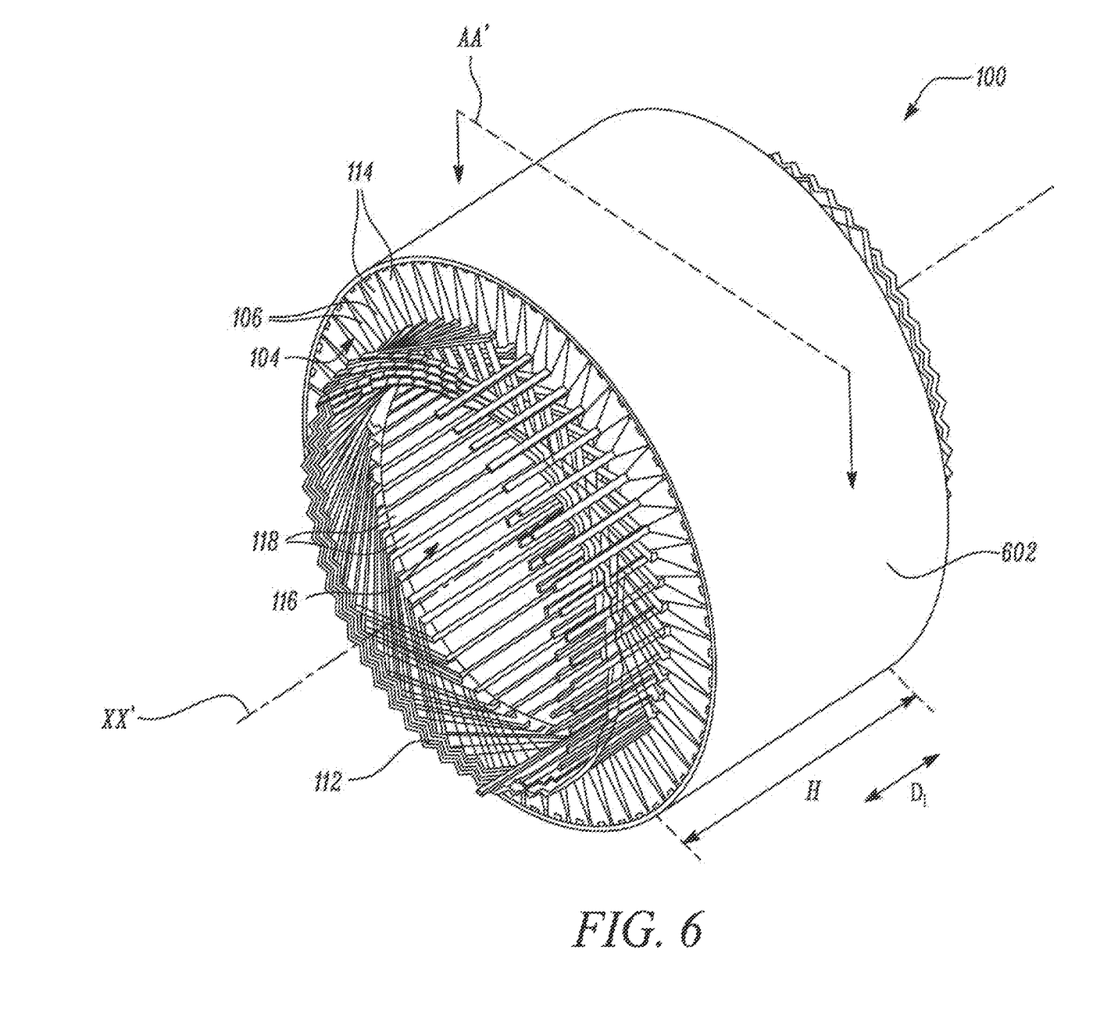
FIG. 6 illustrates a side perspective view of the stator showing a band that is used to secure the wedge members, according to certain embodiments of the present disclosure.
Figure 7:
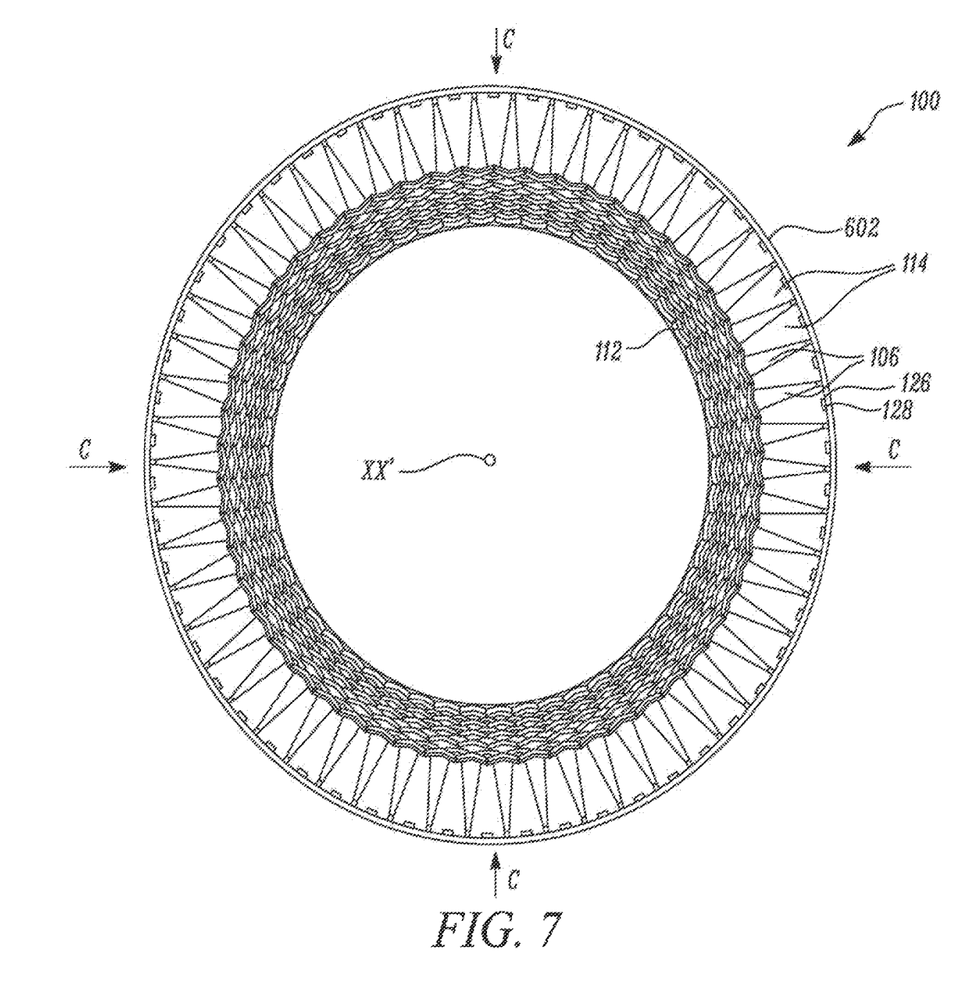
FIG. 7 illustrates a sectional view of the stator taken along sectional plane AA' of FIG. 6, according to certain embodiments of the present disclosure.

Referring to FIGS. 1 and 5, in certain embodiments, an end cap 502 is disposed about the central axis XX' and affixed onto one side of the stator core 104. The end cap 502 has connecting terminals 504a, 504b, and 504c for electrically connecting with ends (not shown) of the electrically transmissive coil 112. Further, as shown best in the view of FIG. 6, a band 602 may be disposed about the wedge members 114 to secure the wedge members 114 with the stator core 104. This band 602 may extend along a height 'H' of the stator core 104. Furthermore, this band 602 may be formed from a metal, a composite, or a polymer. As shown best in the view of FIG. 7, the band 602 may also serve to apply the compressive load 'C' for retaining the wedge members 114 in their respective positions and preventing inter-relative movement between the teeth 106.

In certain embodiments, each tooth 106 may be a monolith (e.g., each tooth 106 may be singularly formed to the height 'H' of the stator core 104). However, in certain other embodiments, each tooth 106 may be stratified along the height 'H' of the stator core 104. In such embodiments, each tooth 106 may comprise at least two teeth members (not shown) that are stacked in a direction 'D1' parallel to the common central axis XX'. For instance, each tooth 106 may comprise multiple metal laminations (e.g., 50 or 100 laminations which are stacked along the direction 'D1').

Figure 8:
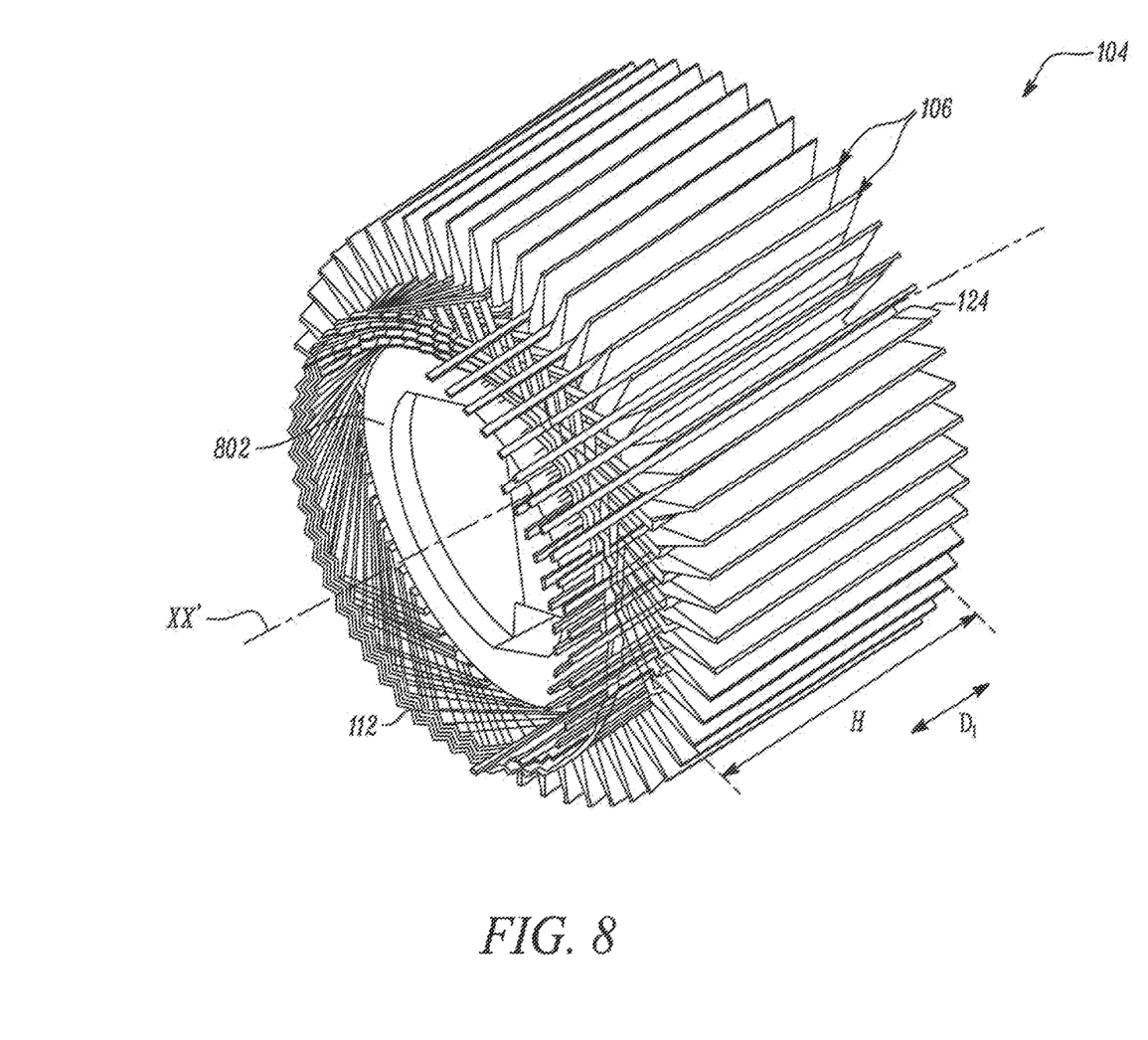
FIG. 8 illustrates a side perspective view of the stator core shown together with an exemplary assembling tool for retaining the teeth while the teeth are wound with the electrically transmissive coil of wire, according to certain embodiments of the present disclosure.

In some embodiments herein, the teeth 106 of the stator core 104 may be arranged radially about the common central axis XX' and located in a spaced apart manner from one another. Such arrangement and location of the teeth 106 imparts a segmented configuration to the stator core 104 that allows manufacturers of electric motors to implement tooling, for example, an assembling tool 802 as shown in the view of FIG. 8 for holding the individual tooth 106 of the stator core 104 via their respective ledge members 120a, 120b. Additionally, manufacturers could also implement other tooling mechanisms that could easily wind the coil of wires 112 over the teeth 106 of the stator core 104, preferably, from outside the stator core 104 towards the ledge members 120a, 120b of each tooth 106 until the coil of wires 112 stacks up on the ledge members 120a, 120b. As access from outside the stator core 104 is established with implementation of embodiments herein, manufacturers of the electric motors 100 disclosed herein can offset costs, time, and effort that were incurred with traditional practices of winding coils of wires from the inside out. (e.g., radially outward from a central axis of previously designed stator cores in which access from an inner diameter to an outer diameter of the stator core 104 would not be permitted due to the presence of a bulk of the stator core 104 between the inner and outer diameters of the stator core 104).

As access to tooling is provided from outside the stator core 104, winding may be easily and quickly accomplished. Thereafter, the wedge members 114 may be inserted in a radially inward direction between successive teeth 106 of the stator core 104 to frictionally engage with the outward portions 110 of the teeth 106. Once engaged, the wedge members 114 help secure the teeth 106 by preventing an inter-relative movement between the teeth 106. Compressive load 'C' may be applied to the ends 126 of the wedge members 114 to frictionally engage the teeth 106. Also, when the band 602 is used, the band 602 may also serve continue applying the compressive load 'C' for retaining the wedge members 114 and securing the teeth 106 in their respective positions.

The foregoing disclosure is not intended to limit the present disclosure to the precise forms or embodiments disclosed herein. As such, it is contemplated that various alternative forms, embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed battery system. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all of which is apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense and should in no way be construed as limiting of the present disclosure. All joinder references (e.g., connected, affixed, and the like) are only used to aid the reader's understanding of the present disclosure, and may not create limitations, particularly as to the position, orientation, or use of the elements disclosed herein. Therefore, joinder references, if any, are to be construed broadly. Moreover, such joinder references may not necessarily infer that two elements are directly connected to each other.

It will also be appreciated that one or more of the elements depicted in the drawings/figures can also be implemented in a more separated or integrated manner, or even removed in certain cases, as is useful in accordance with a particular application.

What is claimed is:

1. A stator for an electric motor, the stator comprising:
   a stator core having a plurality of teeth radially arranged about a common central axis of the stator core and located in a spaced apart manner from one another, each tooth having an inward portion and an outward portion;
   an electrically transmissive coil of wire wound contiguously upon the inward portions of at least a subset of teeth from the plurality of teeth;
   a plurality of wedge members radially arranged about the common central axis and located intermittently with the plurality of teeth such that each wedge member abuts with the outward portions of adjacently located teeth; and
   a band disposed about radially outward portions of the wedge members, wherein the band is configured to apply a compressive load on the radially outward portions of the wedge members directed radially inward towards the common central axis of the stator core such that the plurality of wedge members frictionally engage with the plurality of teeth for restricting relative movement between the plurality of teeth,
   wherein each wedge member defines a recessed portion extending at least partway along a width of the radially outward portion.

2. The stator of claim 1, wherein the band is configured to apply the compressive load on the on the recessed portion of each wedge directed radially inward.

3. The stator of claim 1, wherein an end of the inward portion of each tooth defines a pair of ledge members extending laterally from the tooth which define an opening of a first width.

4. The stator of claim 3, wherein the first width is less than a second width of the electrically transmissive coil of wire.

5. The stator of claim 1, wherein each tooth is stratified along a height of the stator core and comprises at least two teeth members stacked in a direction parallel to the common central axis.

6. The stator of claim 1, wherein each wedge member comprises a radially inward portion proximal to the common central axis and the radially outward portion distal from the common central axis.

7. The stator of claim 6, wherein the width of the radially outward portion is greater than a width of the radially inward portion.

8. The stator of claim 1, wherein the plurality of teeth and the plurality of wedge members are made from a similar material.

9. The stator of claim 1, wherein the plurality of teeth and the plurality of wedge members are made from dissimilar materials.

10. An electric motor comprising:
    a stator comprising:
      a stator core having a plurality of teeth radially arranged about a common central axis of the stator core and located in a spaced apart manner from one another, each tooth having an inward portion and an outward portion;
      an electrically transmissive coil of wire wound contiguously upon the inward portions of at least a subset of teeth from the plurality of teeth;
      a plurality of wedge members radially arranged about the common central axis and located intermittently with the plurality of teeth such that each wedge member abuts with the outward portions of adjacently located teeth; and
      a band disposed about radially outward portions of the wedge members,
      wherein the band is configured to apply a compressive load on the radially outward portions of the wedge members directed radially inward towards the common central axis of the stator core such that the plurality of wedge members frictionally engage with the plurality of teeth for restricting relative movement between the plurality of teeth,
      wherein each wedge member defines a recessed portion extending at least partway along a width of the radially outward portion.

11. The electric motor of claim 10, wherein the band is configured to apply the compressive load on the on the recessed portion of each wedge directed radially inward.

12. The electric motor of claim 10, wherein an end of the inward portion of each tooth defines a pair of ledge members extending laterally from the tooth which define an opening of a first width.

13. The electric motor of claim 12, wherein the first width is less than a second width of the electrically transmissive coil of wire.

14. The electric motor of claim 10, wherein each tooth is stratified along a height of the stator core and comprises at least two teeth members stacked in a direction parallel to the common central axis.

15. The electric motor of claim 10, wherein each wedge member comprises a radially inward portion proximal to the common central axis and the radially outward portion distal from the common central axis.

16. The electric motor of claim 15, wherein the width of the radially outward portion is greater than a width of the radially inward portion.

17. The electric motor of claim 10, wherein the plurality of teeth and the plurality of wedge members are made from a similar material.

18. The electric motor of claim 10, wherein the plurality of teeth and the plurality of wedge members are made from dissimilar materials.

* * * * *